United States Patent
Krieger et al.

(10) Patent No.: US 7,549,504 B2
(45) Date of Patent: Jun. 23, 2009

(54) QUADRANT DEPENDENT ACTIVE DAMPING FOR ELECTRIC POWER STEERING

(75) Inventors: Geoff P. Krieger, Bay City, MI (US); William H. Wittig, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 390 days.

(21) Appl. No.: 11/495,219

(22) Filed: Jul. 28, 2006

(65) Prior Publication Data
US 2008/0023256 A1 Jan. 31, 2008

(51) Int. Cl.
*B62D 5/04* (2006.01)
(52) U.S. Cl. .................... 180/444; 180/446; 701/41; 701/42
(58) Field of Classification Search ................ 180/444, 180/447, 446, 443; 701/41, 42
See application file for complete search history.

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |
| 4,509,611 A | 4/1985 | Kade et al. | 180/446 |
| 4,511,827 A | 4/1985 | Morinaga et al. | 318/254 |
| 4,556,811 A | 12/1985 | Hendricks | 310/266 |

(Continued)

FOREIGN PATENT DOCUMENTS

EP 08 08 029 A2 11/1997

(Continued)

OTHER PUBLICATIONS

Berendsen, Carsten-Sunnke; Campenois, Gerard; and Bolopion Alain; "Commutation Strategies For Brushless DC Motors: Influence on Instant Torque", Apr. 1993, *IEEE Transactions On Power Electronics*, vol. 8 No. 2; pp. 231-236.

(Continued)

*Primary Examiner*—Paul N Dickson
*Assistant Examiner*—Tashiana Adams
(74) *Attorney, Agent, or Firm*—Thomas N. Twomey

(57) ABSTRACT

An electric power steering system includes a steering wheel, an electric assist motor operatively coupled to the steering wheel, and an electronic controller operatively coupled to the motor for receiving a first signal representative of torque applied to the steering wheel, and a second signal representative of angular velocity of the motor. The electronic controller produces an active damping motor command signal according to a function of the first and second signals. The active damping motor command signal is scaled by a first factor if the first and second signals are both positive, or if the first and second signals are both negative, to provide a scaled motor command signal. The active damping motor command signal is scaled by a second factor if the first signal is positive and the second signal is negative, or if the first signal is negative and the second signal is positive, to provide the scaled motor command signal. The scaled motor command signal is applied to the motor.

20 Claims, 3 Drawing Sheets

U.S. PATENT DOCUMENTS

| | | | |
|---|---|---|---|
| 4,558,265 A | 12/1985 | Hayashida et al. | 318/561 |
| 4,633,157 A | 12/1986 | Streater | 318/723 |
| 4,672,253 A | 6/1987 | Tajima et al. | 310/269 |
| 4,686,437 A | 8/1987 | Langley et al. | 318/254 |
| 4,688,655 A | 8/1987 | Shimizu | 180/79.1 |
| 4,692,645 A | 9/1987 | Gotou | 310/184 |
| 4,721,894 A | 1/1988 | Graber | 318/473 |
| 4,739,201 A | 4/1988 | Brigham et al. | 310/49 R |
| 4,745,984 A | 5/1988 | Shimizu | 180/79.1 |
| 4,771,845 A | 9/1988 | Shimizu | 180/446 |
| 4,780,658 A | 10/1988 | Koyama | 318/808 |
| 4,782,272 A | 11/1988 | Buckley et al. | 318/254 |
| 4,789,040 A | 12/1988 | Morishita et al. | 180/446 |
| 4,805,126 A | 2/1989 | Rodems | 702/106 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,856,607 A | 8/1989 | Sueshige et al. | 180/422 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,988,273 A | 1/1991 | Faig et al. | 425/145 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/79.1 |
| 5,048,630 A | 9/1991 | Schaffer | 180/422 |
| 5,053,966 A | 10/1991 | Takahashi et al. | 701/41 |
| 5,063,011 A | 11/1991 | Rutz et al. | 264/126 |
| 5,068,591 A | 11/1991 | Hoegberg et al. | 322/29 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,175,479 A | 12/1992 | Tajima et al. | 318/560 |
| 5,223,775 A | 6/1993 | Mongeau | 318/432 |
| 5,238,079 A | 8/1993 | Gorim | 180/142 |
| 5,239,490 A | 8/1993 | Masaki et al. | 364/565 |
| 5,245,286 A | 9/1993 | Carlson et al. | 312/263 |
| 5,272,429 A | 12/1993 | Lipo et al. | 318/808 |
| 5,309,373 A | 5/1994 | Beebe et al. | 702/41 |
| 5,331,245 A | 7/1994 | Burgbacher et al. | 310/186 |
| 5,339,243 A | 8/1994 | Matsuoka et al. | 701/43 |
| 5,345,156 A | 9/1994 | Moreira | 318/254 |
| 5,349,278 A | 9/1994 | Wedeen | 318/632 |
| 5,349,351 A | 9/1994 | Obara et al. | 341/141 |
| 5,361,210 A | 11/1994 | Fu | 364/424.05 |
| 5,379,741 A | 1/1995 | Matysiewicz et al. | 123/497 |
| 5,428,285 A | 6/1995 | Koyama et al. | 318/799 |
| 5,433,541 A | 7/1995 | Hieda et al. | 400/279 |
| 5,442,268 A | 8/1995 | Goodarzi et al. | 318/432 |
| 5,444,341 A | 8/1995 | Kneifel, II et al. | 318/432 |
| 5,450,306 A | 9/1995 | Garces et al. | 363/41 |
| 5,460,235 A | 10/1995 | Shimizu | 180/79.1 |
| 5,461,293 A | 10/1995 | Rozman et al. | 318/603 |
| 5,465,210 A | 11/1995 | Walenty et al. | 701/1 |
| 5,467,275 A | 11/1995 | Takamoto et al. | 364/426.01 |
| 5,469,215 A | 11/1995 | Nashiki | 318/432 |
| 5,475,289 A | 12/1995 | McLaughlin et al. | 318/432 |
| 5,493,200 A | 2/1996 | Rozman et al. | 322/10 |
| 5,517,415 A | 5/1996 | Miller et al. | 364/424.05 |
| 5,527,053 A | 6/1996 | Howard | 280/90 |
| 5,528,497 A | 6/1996 | Yamamoto et al. | 701/41 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A * | 12/1996 | Richardson et al. | 318/800 |
| 5,616,999 A | 4/1997 | Matsumura et al. | 318/632 |
| 5,623,409 A * | 4/1997 | Miller | 701/41 |
| 5,625,239 A | 4/1997 | Persson et al. | 310/68 B |
| 5,625,269 A | 4/1997 | Ikeda | 318/696 |
| 5,642,044 A | 6/1997 | Weber | 324/207.25 |
| 5,656,911 A | 8/1997 | Nakayama et al. | 318/718 |
| 5,668,721 A | 9/1997 | Chandy | 701/41 |
| 5,668,722 A | 9/1997 | Kaufmann et al. | 701/41 |
| 5,672,944 A | 9/1997 | Gokhale et al. | 318/254 |
| 5,699,207 A | 12/1997 | Supino et al. | 360/78.09 |
| 5,701,065 A | 12/1997 | Ishizaki | 318/701 |
| 5,712,802 A | 1/1998 | Kumar et al. | 702/132 |
| 5,721,479 A | 2/1998 | Kumar et al. | 318/801 |
| 5,739,650 A | 4/1998 | Kimura et al. | 318/254 |
| 5,744,921 A | 4/1998 | Makaran | 218/254 |
| 5,777,449 A | 7/1998 | Schlager | 318/459 |
| 5,780,986 A | 7/1998 | Shelton et al. | 318/432 |
| 5,803,197 A | 9/1998 | Hara et al. | 180/248 |
| 5,811,904 A | 9/1998 | Tajima et al. | 310/156.45 |
| 5,811,905 A | 9/1998 | Tang | 310/179 |
| 5,811,949 A | 9/1998 | Garces | 318/448 |
| 5,811,957 A | 9/1998 | Bose et al. | 318/802 |
| 5,828,973 A | 10/1998 | Takeuchi et al. | 701/41 |
| 5,852,355 A | 12/1998 | Turner | 318/701 |
| 5,881,836 A | 3/1999 | Nishimoto et al. | 180/446 |
| 5,898,990 A | 5/1999 | Henry | 29/598 |
| 5,917,721 A | 6/1999 | Kerkman et al. | 363/98 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,934,398 A | 8/1999 | Hotta | 180/65.8 |
| 5,936,322 A | 8/1999 | Yamaguchi et al. | 310/156.19 |
| 5,941,338 A | 8/1999 | Miller et al. | 180/421 |
| 5,948,030 A | 9/1999 | Miller et al. | 701/41 |
| 5,962,999 A | 10/1999 | Nakamura et al. | 318/432 |
| 5,963,706 A | 10/1999 | Baik | 388/804 |
| 5,965,995 A | 10/1999 | Seibel et al. | 318/805 |
| 5,967,253 A | 10/1999 | Collier-Hallman | 180/421 |
| 5,977,740 A | 11/1999 | McCann | 318/701 |
| 5,977,741 A | 11/1999 | DeLange et al. | 318/801 |
| 5,984,042 A | 11/1999 | Nishimoto et al. | 180/446 |
| 5,992,556 A * | 11/1999 | Miller | 180/446 |
| 6,002,226 A | 12/1999 | Collier-Hallman et al. | 318/439 |
| 6,002,234 A | 12/1999 | Ohm et al. | 318/729 |
| 6,009,003 A | 12/1999 | Yeo | 363/37 |
| 6,013,994 A | 1/2000 | Endo et al. | 318/432 |
| 6,034,459 A | 3/2000 | Matsunobu et al. | 310/156.38 |
| 6,034,460 A | 3/2000 | Tajima et al. | 310/179 |
| 6,034,493 A | 3/2000 | Boyd et al. | 318/254 |
| 6,039,144 A | 3/2000 | Chandy et al. | 180/446 |
| 6,043,624 A | 3/2000 | Masaki et al. | 318/723 |
| 6,046,560 A | 4/2000 | Lu et al. | 318/432 |
| 6,049,182 A | 4/2000 | Nakatani et al. | 318/432 |
| 6,050,360 A | 4/2000 | Pattok et al. | 180/446 |
| 6,064,172 A | 5/2000 | Kuznetsov | 318/716 |
| 6,088,661 A | 7/2000 | Poubion | 702/130 |
| 6,092,618 A | 7/2000 | Collier-Hallman | 180/422 |
| 6,104,150 A | 8/2000 | Oohara et al. | 318/254 |
| 6,121,852 A | 9/2000 | Mizoguchi et al. | 333/35 |
| 6,129,172 A | 10/2000 | Yoshida et al. | 180/446 |
| 6,184,638 B1 | 2/2001 | Kinpara | 318/432 |
| 6,188,189 B1 | 2/2001 | Blake | 318/471 |
| 6,250,419 B1 | 6/2001 | Chabaan et al. | 180/443 |
| 6,250,421 B1 | 6/2001 | Poshadlo | 180/446 |
| 6,250,520 B1 | 6/2001 | Richard et al. | 222/590 |
| 6,272,947 B1 | 8/2001 | Howard | 74/499 |
| 6,281,650 B1 | 8/2001 | Yutkowitz | 318/561 |
| 6,281,659 B1 | 8/2001 | Giuseppe | 318/799 |
| 6,323,614 B1 | 11/2001 | Palazzolo et al. | 318/560 |
| 6,329,781 B1 | 12/2001 | Matsui et al. | 318/717 |
| 6,334,503 B1 | 1/2002 | Fukumura et al. | 180/446 |
| 6,338,016 B1* | 1/2002 | Miller et al. | 701/43 |
| 6,344,721 B2 | 2/2002 | Seki et al. | 318/254 |
| 6,349,789 B1 | 2/2002 | Nakano et al. | 180/446 |
| 6,360,841 B1 | 3/2002 | Blandino et al. | 180/443 |
| 6,373,211 B1 | 4/2002 | Henry et al. | 318/432 |
| 6,380,658 B1 | 4/2002 | Sebastian et al. | 310/261 |

| | | | | |
|---|---|---|---|---|
| 6,389,338 B1 | 5/2002 | Chandy et al. ............... 701/29 |
| 6,392,418 B1 | 5/2002 | Mir et al. .................... 324/503 |
| 6,411,052 B1 | 6/2002 | Mir et al. .................... 318/434 |
| 6,426,602 B1 | 7/2002 | McCann et al. ............. 318/432 |
| 6,429,565 B1 | 8/2002 | Matsunobu et al. .... 310/156.38 |
| 6,429,620 B2 | 8/2002 | Nakazawa et al. .......... 318/701 |
| 6,448,731 B1 | 9/2002 | Miller et al. ................. 318/488 |
| 6,470,225 B1 | 10/2002 | Yutkowitz .................... 700/44 |
| 6,489,761 B1 | 12/2002 | Schroeder et al. ...... 324/207.25 |
| 6,498,409 B1 | 12/2002 | Collier-Hallman et al. 310/68 B |
| 6,501,243 B1 | 12/2002 | Kaneko et al. .............. 318/700 |
| 6,510,396 B1 | 1/2003 | Colosky ..................... 702/85 |
| 6,516,680 B1 | 2/2003 | Nakamura et al. ....... 74/388 PS |
| 6,520,279 B2 | 2/2003 | Fukumoto et al. .......... 180/446 |
| 6,538,429 B2 | 3/2003 | Schroeder et al. ........ 324/207.2 |
| 6,549,871 B1 | 4/2003 | Mir et al. .................... 702/145 |
| 6,555,985 B1 | 4/2003 | Kawabata et al. .......... 318/685 |
| 6,564,125 B2 | 5/2003 | Pattok et al. .................. 701/29 |
| 6,580,627 B2 | 6/2003 | Toshio ......................... 363/98 |
| 6,614,223 B2 | 9/2003 | Schroeder et al. ...... 324/207.22 |
| 6,637,544 B2 * | 10/2003 | Stevens et al. .............. 180/446 |
| 6,647,329 B2 * | 11/2003 | Kleinau et al. ................ 701/41 |
| 6,694,287 B2 | 2/2004 | Mir et al. .................... 702/183 |
| 6,713,921 B2 | 3/2004 | Sebastian et al. ....... 310/156.38 |
| 6,713,922 B2 | 3/2004 | Piech et al. ............ 310/156.43 |
| 6,720,751 B2 | 4/2004 | Plasz et al. .................. 318/567 |
| 6,721,629 B2 | 4/2004 | Wendling et al. ........... 700/279 |
| 6,759,780 B2 | 7/2004 | Liu et al. .................... 310/184 |
| 6,788,013 B2 | 9/2004 | Islam et al. ................. 318/432 |
| 6,900,607 B2 | 5/2005 | Kleinau et al. .............. 318/432 |
| 6,906,443 B2 | 6/2005 | Luo et al. ............... 310/156.47 |
| 6,914,399 B2 | 7/2005 | Kushion et al. ............. 318/434 |
| 6,940,198 B2 | 9/2005 | Ionel et al. ............. 310/156.47 |
| 6,965,820 B2 | 11/2005 | Amberkar et al. ............. 701/41 |
| 2001/0047233 A1 | 11/2001 | Kleinau |
| 2002/0022912 A1 | 2/2002 | Urabe et al. .................. 701/41 |
| 2003/0062868 A1 | 4/2003 | Mir et al. .................... 318/434 |
| 2003/0071594 A1 | 4/2003 | Kleinau et al. .............. 318/567 |
| 2003/0076061 A1 | 4/2003 | Kleinau et al. .............. 318/432 |
| 2003/0076064 A1 | 4/2003 | Kleinau et al. .............. 318/567 |
| 2003/0076065 A1 | 4/2003 | Shafer et al. ................. 318/567 |
| 2003/0146731 A1 | 8/2003 | Berggren et al. ............ 318/708 |
| 2003/0230947 A1 | 12/2003 | Islam et al. ............ 310/156.47 |
| 2004/0112146 A1 | 6/2004 | Islam et al. ............ 73/862.331 |
| 2005/0182542 A1 | 8/2005 | Kwansy et al. ................ 701/41 |

FOREIGN PATENT DOCUMENTS

| | | |
|---|---|---|
| EP | 0 821 468 A2 | 1/1998 |
| EP | 08 221 30 A1 | 2/1998 |
| EP | 0872406 | 10/1998 |
| EP | 0 943 481 A2 | 9/1999 |
| EP | 0966093 | 12/1999 |
| EP | 1170196 | 1/2002 |
| FR | 2843085 | 2/2002 |
| JP | 09051700 | 2/1997 |
| JP | 9-271198 | 10/1997 |
| JP | 11262241 | 9/1999 |

OTHER PUBLICATIONS

Blaabjer, Frede; Pedersen, John K.; Jaeger, Ulrik; and Paul Thoegersen; "Single Current Sensor Technique In the DC Link of Three-Phase PWM-VS Inverters: A Review and a Novel Solution", Sep./Oct. 1997, *IEEE Transactions On Industry Applications*, vol. 33 No. 5; pp. 1241-1249.

De La Ree, Jaime; and Latorre, Jaime; "Permanent Magnet Machines Torque Considerations," *Conference Record of the IEEE Industry Applications Society Annual Meeting Part I*, IEEE Catalog No. 88CH2565-0, Part 1, Oct. 2-7, 1988; pp. 32-37.

De La Ree, Jaime; and Boules, Nady; "Torque Production In Permanent-Magnet Synchronous Motors", Jan./Feb. 1989, *IEEE Transactions On Industry Applications*, vol. 25 No. 1; pp. 107-112.

Mirkazemi-moud, Mehran; Green, Tim C.; and Williams, Barry W.; "Analysis and Comparison of Real-Time Sine-Wave Generation for PMW Circuits", Jan. 1993, *IEEE Transactions On Power Electronics*, vol. 8, No. 1; pp. 46-54.

Murai, Yoshihiro; Kawase, Yoshihiro; and Ohashi, Karuharu; "Torque Ripple Improvement for Brushless DC Miniature Motors," *Conference Record of the 1987 IEEE Industry Applications Society Annual Meeting Part 1*, IEEE Catalog No. 87CH2499-2, Oct. 18-23, 1987; pp. 21-28.

Parasiliti, Francesco; Petrella, Roberto; and Tursini, Marco; "Low Cost Phase Current Sensing in DSP Based AC Drives," *IEEE Transactions*, pp. 1284-1289.

*Brown Boveri Review*, "Static Frequency Changers with"Subharmonic" Control in Conjunction with Reversible Variable-Speed A.C. Drives," Aug./Sep. 1964, vol. 51 No. 8/9; pp. 555-577.

Asaii, B., et al.; "A Simple High Efficient Torque Control For The Electric Vehicle Induction Machine Drives Without A Shaft Encoder"; Power Electronics Specialists Conference, 1995. PESC '95 Records, 26th Annual IEEE Atlanta, GA, USA Jun. 18-22, 1995, pp. 778-784.

Gotter Gottfried; "Erwarmung and Kü hlung elektrischer Maschinin"; Springer Verlag, Berlin 1954; pp. 95-116.

Zoran Lazarevic, et al.; "A Novel Approach For Temperature Estimation In Squirrel-Cage Induction Motor Without Sensors", IEEE Transactions on Instrumentation and Measurement, IEEE Inc. New York, US, vol. 48, No. 3, Jun. 1999, pp. 753-757.

* cited by examiner

QUADRANT DEPENDENT ACTIVE DAMPING FOR ELECTRIC POWER STEERING

BACKGROUND

In a vehicle equipped with electric power steering (EPS), a steering assist force is provided by an electric motor operatively coupled to a steering wheel through a steering column or shaft. Typically, such systems include a controller programmed to derive an assist torque signal along with a "return to center" (i.e., neutral position) torque signal, thereafter summing these torque signals to generate a motor command signal. The assist torque signal is derived using an applied torque signal indicative of torque applied to the steering wheel by a vehicle operator. The assist torque signal provides a power steering boost torque, and the neutral position torque signal provides a return-to-center bias torque.

During EPS operation, the motor command signal is applied to the electric motor, and a sensing device is utilized to sense the angular velocity of the electric motor. Based upon the angular velocity of the electric motor and the applied torque signal, four operational quadrants may be defined. Quadrant I is defined as a motor operating condition wherein the applied torque signal and the angular velocity are both positive. Quadrant II is defined as a motor operating condition wherein the applied torque signal is negative but the angular velocity is positive. In practice, Quadrant II situations arise when the applied torque signal specifies a reversal in motor rotation. In Quadrant III, the applied torque signal and the angular velocity are both negative, whereas in Quadrant IV, the applied torque signal is positive, but the angular velocity is negative. Quadrant III mirrors Quadrant I, but with opposite signs for angular velocity and applied torque signals. Similarly, Quadrant IV mirrors Quadrant II, but with opposite signs for angular velocity and applied torque signals. Although Quadrants I and II are discussed herein, it should be noted that any discussion of Quadrant I also applies to Quadrant III, and also that any discussion of Quadrant II also applies to Quadrant IV.

As a practical matter, EPS systems may exhibit free rotational oscillation resonances that, if left undamped, may not result in a crisp, controlled feeling to the steering. EPS systems are non-linear, providing a steering assist force which varies as a function of vehicle speed, road conditions, and the driving maneuvers being performed. In spite of these variations, good EPS system performance is characterized by linear behavior as perceived from the driver's point of view. Drivers expect steering behavior to remain consistent throughout a wide variety of operating conditions.

In order to impart a stable and precise feel to an EPS system, input-dependent active damping may be utilized. An example of such a technique is presented in U.S. Pat. No. 5,919,241 ("the '241 patent"), Vehicle Having Electric Power Steering With Active Damping, filed Dec. 13, 1996, incorporated by reference herein in its entirety and assigned to the assignee of the present application. In the '241 patent, active damping provides an active damping torque signal that is further summed along with the assist torque signal and the return to center torque signal to produce the torque command signal. This active damping torque signal is derived as a function of a filtered steering shaft position and a sensed vehicle velocity. A filtering mechanism for generating the steering shaft angular velocity applies the amplitude and phase characteristics of a differentiator from 0 Hz through the resonant frequency of free rotational oscillation of the EPS system to the steering shaft position.

A continuing source of difficulty in tuning and controlling EPS systems is a perception by the driver of a difference in damping between operation in Quadrant I as opposed to Quadrant II. However, existing active damping techniques do not modify damping behavior in response to a quadrant transition. As a result, these techniques provide undesirable, inappropriate, and oftentimes annoying tactile feedback to the steering wheel throughout one or more quadrants. Accordingly, what is needed is an improved technique for applying active damping to an EPS system that may operate in any of a plurality of quadrants.

SUMMARY

The above described and other features are exemplified by the following Figures and Description in which an electric power steering system is disclosed that includes a steering wheel, an electric assist motor operatively coupled to the steering wheel, and an electronic controller operatively coupled to the assist motor for receiving a first signal representative of torque applied to the steering wheel and a second signal representative of angular velocity of the assist motor. In response to a sensed position of the steering wheel, the electronic controller produces an assist torque command and a "return to center" torque command. The electronic controller produces an active damping motor command signal according to a function of the first and second signals. The active damping motor command signal is scaled by a first factor if the first and second signals are both positive, or if the first and second signals are both negative, to provide a scaled motor command signal. The active damping motor command signal is scaled by a second factor if the first signal is positive and the second signal is negative, or if the first signal is negative and the second signal is positive, to provide the scaled motor command signal. The scaled motor command signal is summed with the assist torque command and the "return to center" torque command and then applied to the electric assist motor.

BRIEF DESCRIPTION OF THE DRAWINGS

Referring now to the Figures wherein like elements are numbered alike.

DESCRIPTION OF PREFERRED EMBODIMENTS

Figure 1:
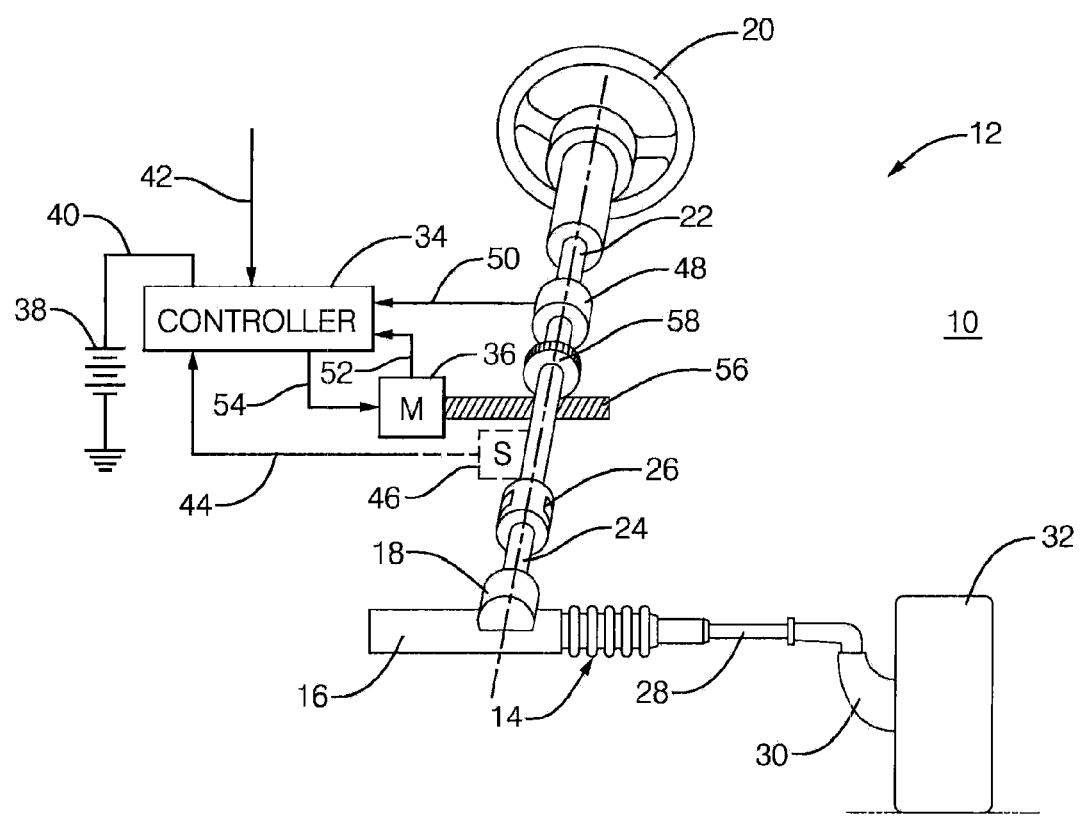
FIG. 1 is a block diagram of an electric power steering system having a controller.

FIG. 1 is a block diagram of a motor vehicle 10 provided with an exemplary electric power steering (EPS) system 12. The EPS system 12 may include a conventional rack and pinion steering mechanism 14, which includes a toothed rack 16 and a pinion gear (not shown) under a gear housing 18. As a steering input member (e.g., a steering wheel 20) is turned, a steered member or upper steering shaft 22 turns a lower steering shaft 24 through a universal joint 26. In turn, the lower steering shaft 24 turns the pinion gear. The rotation of the pinion gear moves the rack 16, which then moves a pair of tie-rods 28 (only one shown) coupled to a pair of steering knuckles 30 (only one shown) to turn a pair of road wheels 32 (only one shown).

Electric power assist is provided through a controller 34 in conjunction with a power assist actuator, such as an electric motor 36. The controller 34 receives electric power from a vehicle electric power source 38 through a line 40. Inputs to the controller 34 include a signal 42 representative of the vehicle velocity, as well as a signal 44 representative of steering pinion gear angle from a column or shaft rotational position sensor 46. A motor velocity signal, $\omega_M$, may be determined by differentiating an output of rotational position sensor 46. However, it is contemplated that alternate embodiments may obtain motor velocity signal $\omega_M$ from a velocity sensor such as, for example, a tachometer or a resolver. As steering wheel 20 is turned, a torque sensor 48 senses the torque applied to steering wheel 20 by the vehicle operator and provides an input steering torque signal 50 to controller 34. In addition, as the rotor of motor 36 turns, motor position signals 52 for each phase are generated within motor 36 and are provided to the controller 34.

In response to received signals representative of vehicle velocity, operator-applied torque, steering pinion gear angle and rotor position, controller 34 derives desired motor voltages or currents and provides such voltages or currents through a motor command signal 54 to motor 36. Thereby, motor 36 supplies a torque assist to upper and lower steering shafts 22, 24 through a worm 56 and associated worm gear 58. If torque sensor 48 is of the type that requires upper steering shaft 22 to be separated at the sensor between upper and lower sections (allowing some range of rotational independence), both rotational position sensor 46 and worm gear 58 are associated with the lower section of the steering shaft below torque sensor 48, as shown.

Figure 2:
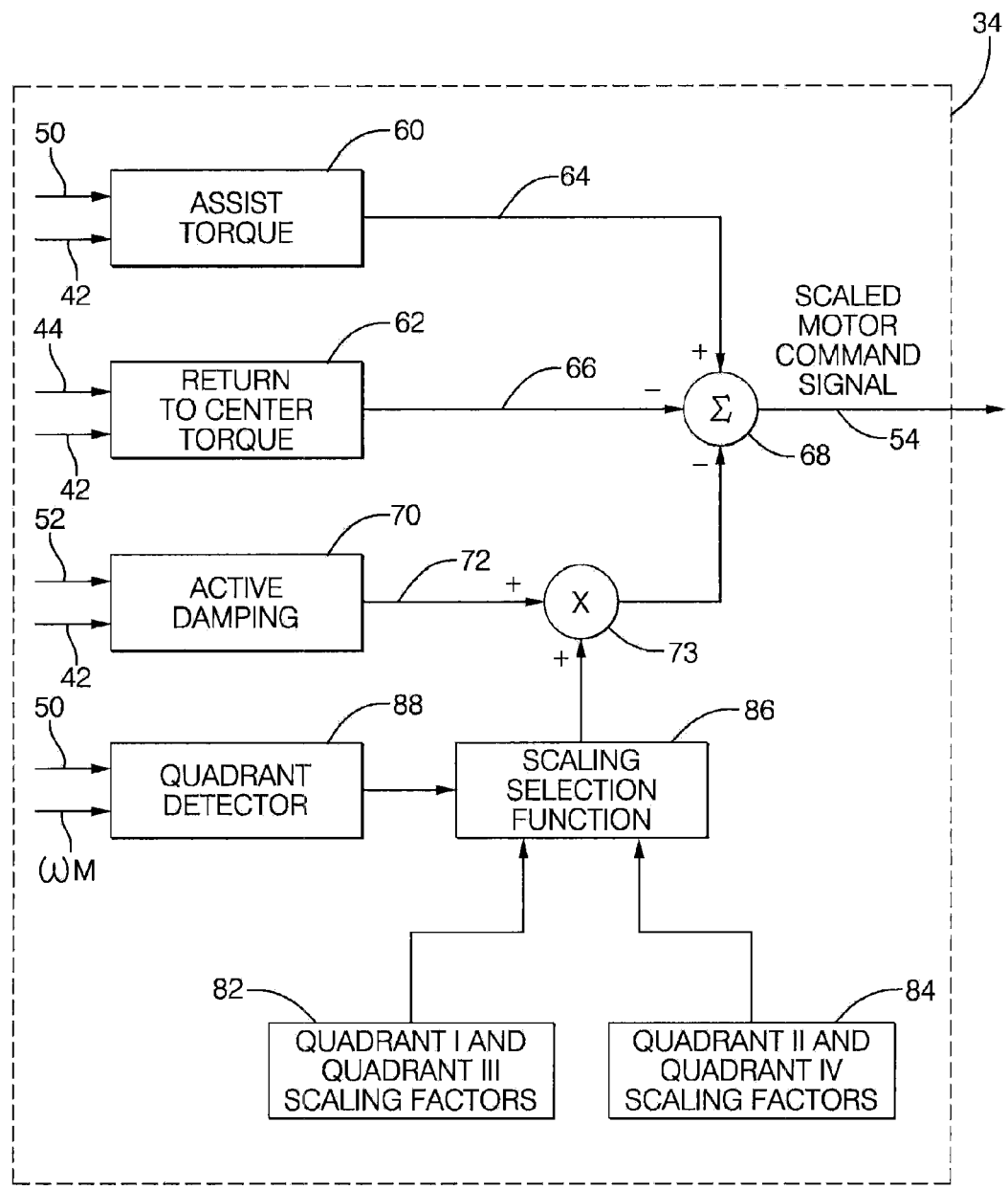
FIG. 2 is a block diagram of a first quadrant-dependent active damping system associated with the controller of FIG. 1.

Referring now to FIG. 2, there is shown a block diagram of an active damping system associated with the EPS controller 34 shown in FIG. 1. As described earlier, a desired assist torque is derived at block 60. The desired assist torque, in turn, determines a desired assist torque current or voltage that represents the amount of motor current or voltage, respectively, to be commanded, specifically responsive to the inputs of input steering torque signal 50 and vehicle velocity signal 42. The desired assist torque current or voltage is outputted by block 60, illustratively in the form of an assist torque command signal 64.

An active damping block 70 is also included in controller 34, in order to determine an active damping torque command signal 72 representing an active damping voltage or current. Preferably, the active damping torque command signal 72 is derived from motor position signals 52 and vehicle velocity signal 42, and is outputted to summation block 68. The magnitude of the active damping torque command signal 72 is subtracted from the difference between the assist torque command signal 64 and the return to center torque command signal 66. Alternatively, however, active damping block 70 may receive pinion gear angle signal 44 rather than motor position signal 52. In an alternate embodiment, the return to center torque block 62 may be omitted altogether, since vehicle chassis characteristics may themselves provide a return to center torque.

At block 88, a quadrant detector uses input steering torque signal 50 and motor velocity signal, $\omega_M$ derived from rotational position sensor 46 (FIG. 1) to identify a quadrant in which motor 36 (FIG. 1) is operating. Recall that input steering torque signal 50 represents an applied torque signal indicative of torque applied to the steering wheel by a vehicle operator. Based upon motor velocity signal $\omega_M$ representative of the angular velocity of motor 36 (FIG. 1), as well as input steering torque signal 50 (FIG. 2) representative of an applied torque signal, motor operation in one of four quadrants may be determined. Quadrant I is defined as a motor operating condition wherein the applied torque signal and the angular velocity are both positive. Quadrant II is defined as a motor operating condition wherein the applied torque signal is negative but the angular velocity is positive. In practice, Quadrant II situations arise when the applied torque signal specifies a reversal in motor rotation. In Quadrant III, the applied torque signal and the angular velocity are both negative, whereas in Quadrant IV, the applied torque signal is positive, but the angular velocity is negative. Quadrant III mirrors Quadrant I, but with opposite signs for angular velocity and applied torque signals. Similarly, Quadrant IV mirrors Quadrant II, but with opposite signs for angular velocity and applied torque signals.

Quadrant I and Quadrant III scaling factors 82 represent a set of scaling factors that are applicable to motor operation in Quadrant I or Quadrant III. These scaling factors 82 are stored in an electronic memory readable by controller 34 (FIG. 1), illustratively as one or more look-up tables. Quadrant II and Quadrant IV scaling factors 84 (FIG. 2) represent a set of scaling factors that are applicable to motor operation in Quadrant II or Quadrant IV. These scaling factors 84 are also stored in an electronic memory readable by controller 34 (FIG. 1), illustratively as one or more look-up tables. Optionally, scaling factors 82 and 84 (FIG. 2) may be stored in the same look-up table or in different look-up tables. Pursuant to a further embodiment, scaling factors 82 and 84 are selected to be within the range of approximately 0% to 500%.

At block 86, a scaling selection function selects the appropriate scaling factors based upon the quadrant detected by quadrant detector in block 88. If the detected quadrant is Quadrant I or Quadrant III, then Quadrant I and III scaling factors are applied to the active damping signal generated at block 70, illustratively using a multiplier 73. On the other hand, if the detected quadrant is Quadrant II or Quadrant IV, then Quadrant II and IV scaling factors are applied to the active damping signal generated at block 70, illustratively using multiplier 73. The output of multiplier 73 represents a scaled active damping signal that has been scaled based upon the quadrant in which motor 36 (FIG. 1) is operating.

As described earlier, a desired return to center torque is derived at block 62 (FIG. 2). The desired return to center torque thus determines the magnitude of a return to center torque current or voltage, and is responsive to vehicle velocity signal 42 and pinion gear angle signal 44. The desired return to center torque current or voltage is outputted by block 62 through a return to center torque command signal 66. Signals 64 and 66 are inputted to summation block 68, wherein the magnitude of the return to center torque command signal 66 is subtracted from the magnitude of the assist torque command signal 64.

Figure 3:
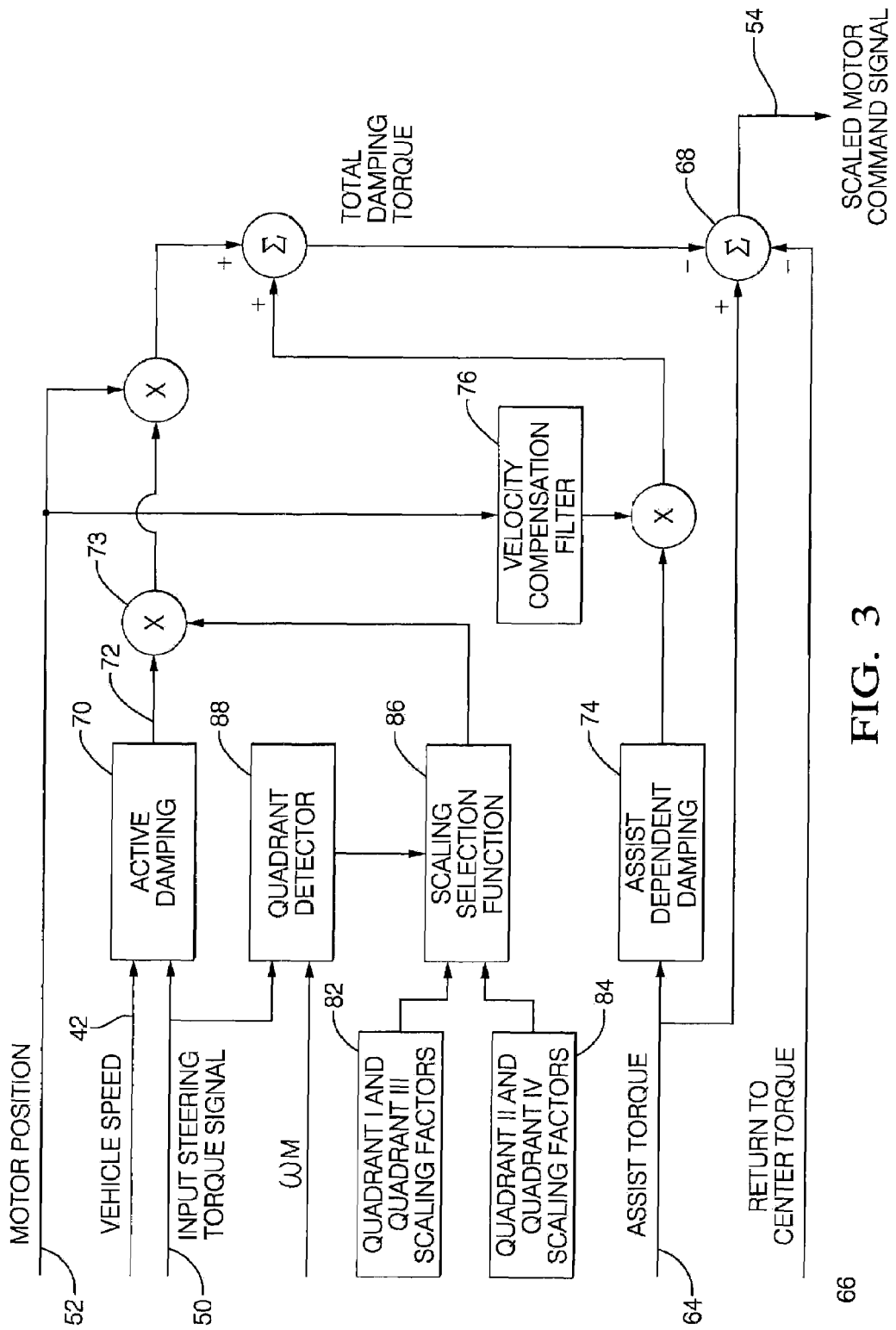
FIG. 3 is a block diagram of a second quadrant-dependent active damping system associated with the controller of FIG. 1.

FIG. 3 is a block diagram of a second active damping system associated with the controller of FIG. 1. In this embodiment, torque command or assist dependent damping, as well motor velocity frequency dependent damping, is further provided in the determination of a total quadrant-dependent damping torque. An assist dependent damping block 74 was incorporated to aid in stability of the system without compromising on-center feel. By changing the amount of damping as a function of quadrant operation and assist level, larger values of damping may be provided at higher assist torques, while lesser or no extra damping may be provided at low assist torques (such as encountered on-center). Thereby, the return ability and on-center feel of the system is prevented from being adversely affected. Additional details regarding assist dependent damping may be found in U.S. application Ser. No. 09/829,311, filed Apr. 9, 2001, assigned to the assignee of the present application, the contents of which are incorporated herein by reference.

At block 88, a quadrant detector uses input steering torque signal 50 and motor velocity signal, $\omega_M$ derived from rotational position sensor 46 to identify a quadrant in which motor 36 (FIG. 1) is presently operating. Based upon motor velocity signal $\omega_M$ representative of the angular velocity of motor 36 (FIG. 1), as well as input steering torque signal 50 representative of an applied torque signal, motor operation in one of four quadrants may be determined. Quadrants I, II, III, and IV were defined previously in conjunction with FIG. 2, and these definitions also apply to the system of FIG. 3.

Quadrant I and Quadrant III scaling factors 82 (FIG. 3) represent a set of scaling factors that are applicable to motor operation in Quadrant I or Quadrant III. These scaling factors 82 are stored in an electronic memory readable by controller 34 (FIG. 1), illustratively as one or more look-up tables. Quadrant II and Quadrant IV scaling factors 84 (FIG. 3) represent a set of scaling factors that are applicable to motor operation in Quadrant II or Quadrant IV. These scaling factors 84 are also stored in an electronic memory readable by controller 34 (FIG. 1), illustratively as one or more look-up tables. Optionally, scaling factors 82 and 84 (FIG. 3) may be stored in the same look-up table or in different look-up tables. Pursuant to a further embodiment, scaling factors 82 and 84 are selected to be within the range of approximately 0% to 500%.

At block 86, a scaling selection function selects the appropriate scaling factors based upon the quadrant detected by quadrant detector in block 88. If the detected quadrant is Quadrant I or Quadrant III, then Quadrant I and III scaling factors are applied to the active damping signal generated at block 70, illustratively using a multiplier 73. On the other hand, if the detected quadrant is Quadrant II or Quadrant IV, then Quadrant II and IV scaling factors are applied to the active damping signal generated at block 70, illustratively using multiplier 73.

The output of multiplier 73 represents a scaled active damping signal that has been scaled based upon the quadrant in which motor 36 (FIG. 1) is operating. This scaled damping signal is combined with an assist torque signal produced at block 60 (FIG. 2) and a return to center torque signal produced at block 62 (FIG. 2), illustratively using a summer 68, to provide a scaled motor command signal 54.

A velocity compensation filter 76 was added to the motor velocity path and used in conjunction with the assist dependent damping block 74 in order to aid in stabilizing systems with analog velocity sensors. The velocity compensation filter 76 further improves stability, disturbance rejection, and on-center feel properties of the system. Filter 76 may include any general first, second, or higher order filter with appropriate characteristics. Additional details regarding the unity gain frequency dependent damping filter 76 may be found in U.S. Provisional Application Ser. No. 60/297,066, filed Jun. 8, 2001, assigned to the assignee of the present application, the contents of which are incorporated herein by reference.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. An electric power steering system including:
   a steering wheel,
   an electric assist motor operatively coupled to the steering wheel, and
   an electronic controller operatively coupled to the assist motor for receiving a first signal representative of torque applied to the steering wheel, and a second signal representative of angular velocity of the assist motor; the electronic controller producing an active damping motor command signal as a function of the first and second signals;
   wherein the active damping motor command signal is scaled by a first scaling factor if the first and second signals are both positive, or if the first and second signals are both negative, to provide a scaled motor command signal;
   wherein the active damping motor command signal is scaled by a second scaling factor if the first signal is positive and the second signal is negative, or if the first signal is negative and the second signal is positive, to provide the scaled motor command signal.

2. The electric power steering system of claim 1 wherein the scaled motor command signal is applied to the electric assist motor.

3. The electric power steering system of claim 1 wherein the controller is programmed to scale the active damping motor command signal in response to detecting an operational quadrant from a plurality of operational quadrants in which the electric assist motor is capable of operating, the plurality of operational quadrants including at least a first quadrant defined as a motor operating condition wherein the first and second signals are both positive, and a second quadrant defined as a motor operating condition wherein the first signal is negative and the second signal is positive.

4. The electric power steering system of claim 3 wherein the plurality of operational quadrants further include a third quadrant defined as a motor operating condition such that the first and second signals are both negative, and a fourth quadrant wherein the first signal is positive and the second signal is negative.

5. The electric power steering system of claim 1, wherein the electronic controller receives a third signal indicative of a road speed of a vehicle, the electronic controller further comprises an input-dependent damping function responsive to the third signal, and the scaled motor command signal is responsive to the input-dependent damping function.

6. The electric power steering system of claim 5, further comprising a steered member coupled to the steering wheel and a torque sensor coupled to the steered member for sensing a driver torque input to produce the first signal;
   wherein the input-dependent damping function is responsive to the driver torque input, and the scaled motor command signal is responsive to the input-dependent damping function.

7. The electric power steering system of claim 6 wherein the input-dependent damping function is responsive to at least one of the first and second signals.

8. The electric power steering system of claim 1 wherein the first scaling factor and the second scaling factor are stored in a computer-readable memory device capable of being accessed by the controller.

9. The electric power steering system of claim 8 wherein the first scaling factor and the second scaling factor are stored in the computer-readable memory device in the form of one or more look-up tables.

10. The electric power steering system of claim 9 wherein the first scaling factor and the second scaling factor each comprise one or more constants.

11. A method for controlling an electric power steering system comprising a steering wheel, an electric assist motor operatively coupled to the steering wheel, and an electronic controller operatively coupled to the assist motor, the method including:
   receiving a first signal representative of torque applied to the steering wheel,
   receiving a second signal representative of angular velocity of the assist motor,
   producing an active damping motor command signal as a function of the first and second signals,
      scaling the active damping motor command signal by a first scaling factor if the first and second signals are both positive, or if the first and second signals are both negative, to provide a scaled motor command signal;
      scaling the active damping motor command signal by a second scaling factor if the first signal is positive and the second signal is negative, or if the first signal is negative and the second signal is positive, to provide the scaled motor command signal.

12. The method of claim 11 further comprising applying the scaled motor command signal to the electric assist motor.

13. The method of claim 11 further comprising:
   scaling the active damping motor command signal in response to detecting an operational quadrant from a plurality of operational quadrants in which the electric assist motor is capable of operating, the plurality of operational quadrants including at least a first quadrant defined as a motor operating condition wherein the first and second signals are both positive, and a second quadrant defined as a motor operating condition wherein the first signal is negative and the second signal is positive.

14. The method of claim 13 wherein the plurality of operational quadrants further include a third quadrant defined as a motor operating condition such that the first and second signals are both negative, and a fourth quadrant wherein the first signal is positive and the second signal is negative.

15. The method of claim 11 further including:
   receiving a third signal indicative of a road speed of a vehicle, the electronic controller further comprises an input-dependent damping function responsive to the third signal, and the scaled motor command signal is responsive to the input-dependent damping function.

16. The method of claim 15 wherein the input-dependent damping function is responsive at least to the first signal and the third signal, and the scaled motor command signal is responsive to the input-dependent damping function.

17. The method of claim 16 wherein the
   input-dependent damping function is responsive to at least one of the first and second signals.

18. The method of claim 1 further comprising storing the first scaling factor and the second scaling factor in a computer-readable memory device capable of being accessed by the controller.

19. The method of claim 18 further comprising storing the first scaling factor and the second scaling factor in the computer-readable memory device in the form of one or more look-up tables.

20. The method of claim 18 wherein the first scaling factor and the second scaling factor each comprise one or more constants.

* * * * *